(No Model.)

J. LEONARD.
LUBRICATOR.

No. 259,322. Patented June 13, 1882.

Witnesses.
John F. C. Vrienkert
Fred A. Powell.

Inventor.
Johnson Leonard
by Crosby & Gregory Atty's.

UNITED STATES PATENT OFFICE.

JOHNSON LEONARD, OF HARRISBURG, PENNSYLVANIA.

LUBRICATOR.

SPECIFICATION forming part of Letters Patent No. 259,322, dated June 13, 1882.

Application filed April 6, 1882. (No model.)

*To all whom it may concern:*

Be it known that I, JOHNSON LEONARD, of Harrisburg, county of Dauphin, and State of Pennsylvania, have invented an Improvement in Lubricators, of which the following description, in connection with the accompanying drawings, is a specification.

My invention relates to a lubricator especially intended for lubricating the piston-rods of steam-engines, and has for its object to produce a lubricator that can be readily attached to any engine without employing tools, and which will be economical and efficient in operation.

The lubricator consists essentially of a vessel or reservoir to contain the oil or lubricating material, provided with one or more flexible attaching-strips of metal which can be easily bent into proper shape to form hooks or fastenings for attaching the said vessel to the stuffing-box for the piston-rod.

The vessel is provided with one or more tubes extending through from the outside to the inside thereof, which when in use are filled with wicking or fibrous material packed in tightly enough to prevent the oil from passing through the said tube too rapidly. The end of the said wicking extends out from the end of the tube, and the vessel is held in proper position to cause the said projecting end of the wicking to rest against the piston-rod as it passes to and fro in its action, the said wicking thus serving to spread or distribute the said lubricant uniformly along the piston-rod.

By extending the feeding tube or tubes some distance into the reservoir, or having their orifices into which the oil passes located above the bottom of the vessel, the sedimentary matter or grit that may be contained in the lubricant will settle below the said orifice, and will consequently not be delivered upon the piston-rod. The feeding tube or tubes may be of any desired length, and may pass through the walls of a vessel at any desired point.

The attaching-strips of a vessel may be properly bent to hold it in any desired position, determined by the relations of the parts of the engine to which it is attached.

Figure 1:
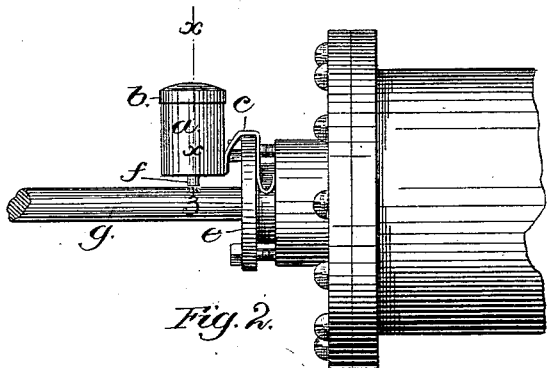
Figure 2:
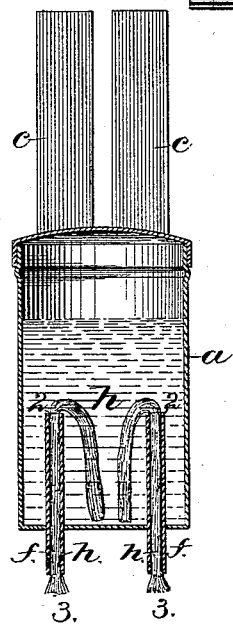

Figure 1 is a side elevation of a portion of an engine-cylinder, stuffing-box, and piston-rod provided with a lubricator embodying this invention; and Fig. 2, a vertical section of the said lubricator on the dotted line $x\,x$, Fig. 1.

The vessel $a$, for containing the lubricating material, may be of any suitable size, shape, and material, it being shown as having a removable cap or cover, $b$, to afford access to its interior.

The said vessel $a$ is provided with one or more attaching-strips, $c$, which may be of any flexible material—such as brass or other metal—so that it can be readily bent to fit the gland $e$ of the stuffing-box of any engine to which it is desired to apply the lubricator, it requiring no tools and very little skill to thus attach the lubricator.

The vessel $a$ is provided with one or more oil-feeding tubes, $f$, passing from a point, 2, within the vessel and above the bottom thereof, as shown in Fig. 2, to a point just above the piston-rod $g$, (see Fig. 1,) when the said lubricating device is in place on the engine.

The tubes $f$ are filled with wicking or fibrous material, $h$, which is packed in with sufficient tightness to prevent the lubricant from feeding too rapidly. The ends of the said wicking extend out from the tubes $f$, as shown at 3, and are intended to rest in contact with the piston-rod $g$ as it travels back and forth, thus wiping its surface and distributing the lubricating material uniformly along the said piston-rod.

By having the feeding-tubes $h$ open in the chamber $a$ above its bottom, as shown in Fig. 2, the sedimentary material or grit that may be contained in the lubricator will settle in the bottom of the vessel $a$ around the said tubes, and will not be conveyed therethrough upon the piston-rod.

In case the piston-rod is provided with a large cross-head which comes close to the stuffing-box $e$ in its stroke, the vessel $a$ may be held in such position as not to interfere with the said cross-head, and the tube or tubes $f$ may be properly directed to pass between the gland of the stuffing-box and the cross-head when nearest thereto.

If the gland of the stuffing-box be of peculiar shape, or if one of the nuts which tightens it be immediately over the piston-rod, the oil-receptacle may be provided with two attaching-strips properly located to straddle the said nut; or the bands may be so arranged and bent as to sustain the oil-receptacle at one side of the stuffing-box, and the feeding-tube may be bent to reach the piston-rod without departing from the principle of my invention.

It is obvious, also, that its use is not confined to steam-engines, but that one of its advantages consists in its ready adaptability to all parts of a machine which flexible supporting-strips can readily be bent to conform to.

I am aware that lubricators have been made in which the oil-delivery tube has its receiving-opening above the level of the oil, which is fed through it by a capillary siphon, and I do not claim such construction.

It will be seen that the wicking employed in the present invention does not act as siphon during the greater part of the operation of the lubricator, but merely serves to retard the flow of oil through the said tubes and spread it on a surface to be lubricated.

I claim—

1. In a lubricator, the reservoir or chamber to contain the lubricating material, combined with a flexible attaching-strip connected with the said reservoir, and a delivering orifice or passage, substantially as described.

2. The oil-reservoir and its flexible attaching-strip adapted to be bent into engagement with a piston-rod stuffing-box, or other mechanism to be lubricated, combined with a delivering-tube, extending from the interior of the said reservoir to the exterior thereof, provided with fibrous material to retard the flow of the lubricating material and distribute it upon the piston-rod or part to be lubricated, substantially as described.

In testimony whereof I have signed my name to this specification in the presence of two subscribing witnesses.

JOHNSON LEONARD.

Witnesses:
JOHN A. HOPKINS,
ALBERT WALLER.